US 6,624,983 B1

(12) United States Patent
Berding

(10) Patent No.: US 6,624,983 B1
(45) Date of Patent: Sep. 23, 2003

(54) MECHANICAL DUAL STAGE ACTUATOR LINKAGE FOR A HARD DISK DRIVE

(75) Inventor: Keith R. Berding, San Jose, CA (US)

(73) Assignee: Western Digital Technologies, Inc., Lake Forest, CA (US)

(*) Notice: Subject to any disclaimer, the term of this patent is extended or adjusted under 35 U.S.C. 154(b) by 281 days.

(21) Appl. No.: 09/796,919

(22) Filed: Feb. 28, 2001

(51) Int. Cl.[7] .................................................. G11B 5/55
(52) U.S. Cl. ............................ 360/294.6; 360/294.2; 360/294.4
(58) Field of Search .......................... 360/294.1, 294.2, 360/294.3, 294.4, 294.6

(56) References Cited

U.S. PATENT DOCUMENTS

| | | | | |
|---|---|---|---|---|
| 5,189,578 A | * | 2/1993 | Mori et al. | 360/294.6 |
| 5,801,908 A | * | 9/1998 | Akiyama et al. | 360/294.4 |
| 6,025,975 A | * | 2/2000 | Fard et al. | 360/294.4 |
| 6,052,251 A | * | 4/2000 | Mohajerani et al. | 360/78.05 |
| 6,088,194 A | * | 7/2000 | Imaino et al. | 360/294.3 |
| 6,157,522 A | * | 12/2000 | Murphy et al. | 360/294.6 |
| 6,249,064 B1 | * | 6/2001 | Bradbury | 310/22 |
| 6,268,983 B1 | * | 7/2001 | Imada et al. | 360/294.3 |
| 6,310,750 B1 | * | 10/2001 | Hawwa et al. | 360/294.6 |
| 6,327,120 B1 | * | 12/2001 | Koganezawa et al. | 360/294.4 |
| 6,335,849 B1 | * | 1/2002 | Khan et al. | 360/294.4 |
| 6,507,463 B1 | * | 1/2003 | Boutaghou | 360/294.3 |
| 6,515,834 B1 | * | 2/2003 | Murphy | 360/294.4 |

OTHER PUBLICATIONS

S. Koganezawa, K. Takaishi, Y. Mizoshita, Y. Uematsu, T. Yamada, S. Hasegawa and T. Ueno; A Flexural Piggiback Milli–Actuator for Over 5 Gbit/in.^2 Density Magnetic Recording, vol. 32, No. 5, Sep. 1996, pp. 3908–3910.

K. Takaishi, T. Imamura, Y. Mizoshita, S. Hasegawa, T. Ueno and T. Yamada; Microactuator Control for Disk Drive, IEEE Transactions on Magnetics, vol. 32, No. 3, May 1996, pp. 1863–1866.

K. Mori, T. Munemoto, H. Otsuki, Y. Yamaguchi and K. Akagi; A Dual–Stage Magnetic Disk Drive Actuator Using a Piezoelectric Device for High Track Density, IEEE Transactions on Magnetics, vol. 27, No. 6, Nov. 1991, pp. 5298–5300.

Bill McInerney; Surveying Micro–Positioning Technology for Advanced Disk Drives, Data Storage, Aug. 2000, pp. 24, 26, 27.

* cited by examiner

Primary Examiner—Jefferson Evans
(74) Attorney, Agent, or Firm—Won Tae C. Kim, Esq.; Milad G. Shara, Esq.; Stetina Brunda Garred & Brucker

(57) ABSTRACT

A head stack assembly for use in a disk drive includes a body portion having a bore which defines a pivot axis. The head stack assembly includes an actuator arm body extending from the body portion and defining a longitudinal axis. The actuator arm body rotates about the pivot axis. The head stack assembly includes a load beam extending from the actuator arm body. The head stack assembly includes a head connected to the load beam. The head stack assembly includes a linear actuator connected to the body portion. The linear actuator expands and contracts. The head stack assembly includes an actuation linkage interposed between the actuator arm body and the load beam. The actuation linkage is connected to the linear actuator element. Selective expansion/contraction of the linear actuator moves the actuation linkage which moves the load beam and the head with a transverse component relative to the longitudinal axis.

16 Claims, 2 Drawing Sheets

US 6,624,983 B1

MECHANICAL DUAL STAGE ACTUATOR LINKAGE FOR A HARD DISK DRIVE

CROSS-REFERENCE TO RELATED APPLICATIONS

Not Applicable.

BACKGROUND OF THE INVENTION

1. Field of the Invention

The present invention relates generally to head stack assemblies, and more particularly to a head stack assembly having an actuation linkage for moving a load beam and attached head.

2. Description of the Prior Art

A typical disk drive includes several disks having tracks with the disks stacked upon one another, a disk controller for generating a servo control signal, a disk drive base, and a head stack assembly attached to the disk drive base. The head stack assembly includes a body portion having a bore. The bore defines a pivot axis. The head stack assembly further includes several actuator arm bodies which extend from the body portion. Each of the actuator arm bodies generally define a longitudinal axis and are configured perpendicular to the pivot axis. Each of the actuator arm bodies is provided with load beam, sometimes a pair of load beams, which extends from it along the longitudinal axis. Suspended distally from each load beam is a head. The body portion and the actuator arm bodies are configured to rotate about the pivot axis in response to the generated servo control signals from the disk controller that actuates a voice coil motor. In so doing, the attached load beams and heads to move relative to the tracks disposed upon the disks. Thus the servo control signals are used for selectively positioning the heads over respective tracks.

There have been prior art attempts to modify the head stack assembly design to refine the controlled positioning of the heads in relation to respective tracks. Such designs have been referred to as implementing dual or second stage actuation. In this context, primary actuation refers to the servo controlled rotational movement of the actuator arm bodies about the pivot as actuated by the voice coil motor.

Second stage actuation offers increased positioning control of the head relative to a given track, which in turn results in the ability to more tightly space the tracks, and therefore resulting in the benefit of the disks having an increased data density.

In a prior art design, for example, the load beam may be modified so as to be of a two-piece construction. A distal portion of the load beam may be controlled to move relative to the rest of the load beam for moving the attached head. An actuator is attached to the load beam for providing the force required to move the distal portion of the load beam. Some current designs implement two actuators for each load beam. Such actuators may be formed of a piezo-electric material. In this regard, the actuator controlled movement of the distal portion of the load beam is considered to be a second stage actuation of the movement of the attached head.

However, assembly considerations regarding the actuator on such two-piece load beam present many technical difficulties. Such a prior art design requires the burden of attachment of an actuator to each load beam. Attachment of such actuator to the load beam results in a subassembly which is a relatively fragile part. In this regard, further handling of such subassembly requires special care. Further, such subassembly must typically undergo a testing process, the failure of which results in loss of an expensive part. Next, the actuator/load beam/head subassembly must be physically attached to and electrically connected with an actuator arm body. As the actuator/load beam/head subassembly is relatively fragile, the actuator arm body physical attachment and electrical connection processes must be taken with special care. The resulting subassembly must typically undergo a testing process, the failure of which results in loss of an expensive part. Finally, where a resulting head stack assembly includes an array of closely spaced actuator arm bodies, such head stack assembly must be specially handled so as to protect the actuators from damage during shipment.

Other prior art second stage actuation designs include micro-actuation at the head level. This results in the various problems as discussed above with respect to actuators mounted at the load beam level, as well as additional other difficulties.

Accordingly, there is a need in the art for an improved head stack assembly implementing a second stage actuation in comparison to the prior art.

SUMMARY OF THE INVENTION

An aspect of the invention can be regarded as a head stack assembly for use in a disk drive. The head stack assembly includes a body portion having a bore. The bore defines a pivot axis. The head stack assembly further includes at least one actuator arm body extending from the body portion and defining a longitudinal axis. The at least one actuator arm body is sized and configured to rotate about the pivot axis disposed perpendicular to the longitudinal axis. The head stack assembly further includes at least one load beam extending from the at least one actuator arm body along the longitudinal axis. The head stack assembly further includes a head connected to the at least one load beam. The head stack assembly further includes a linear actuator connected to the body portion. The linear actuator is sized and configured to selectively expand and contract. The head stack assembly further includes at least one actuation linkage connected with and interposed between the at least one actuator arm body and the at least one load beam. The at least one actuation linkage is further connected to the linear actuator. Selective expansion/contraction of the linear actuator moves the at least one actuation linkage which moves the connected at least one load beam and the connected head with a transverse component relative to the longitudinal axis of the associated at least one actuator arm body.

In an embodiment of the present invention, the at least one actuation linkage includes a distal member connected with an intermediate member. The distal member is distally connected to the at least one actuator arm body and the at least one load beam. The intermediate member is connected to the linear actuator and extends along the at least one actuator arm body. The at least one actuation linkage may include an actuation linkage hinge interposed between and attached to the distal member and the intermediate member. The at least one actuation linkage may include a distal member hinge interposed between and attached to the distal member and the at least one actuator arm body. The at least one actuation linkage may further include an intermediate member hinge interposed between and attached to the intermediate member and the at least one actuator arm body. It is contemplated that at least one actuator arm body may include a plurality of actuator arm bodies. In this regard, the at least one load beam includes a plurality of load beams associated with respective ones of the plurality of actuator arm bodies, and the at least one actuation linkage includes a plurality of actuation linkages associated with respective ones of the plurality of actuator arm bodies and the plurality of load beams. Preferably, the linear actuator is a piezoelectric element. Further, the body portion may include a shoulder, and the linear actuator may be attached to the shoulder.

In addition, according to another aspect of the present invention, there is provided a disk drive which includes the above described head stack assembly.

DESCRIPTION OF THE PREFERRED EMBODIMENTS

Figure 1:
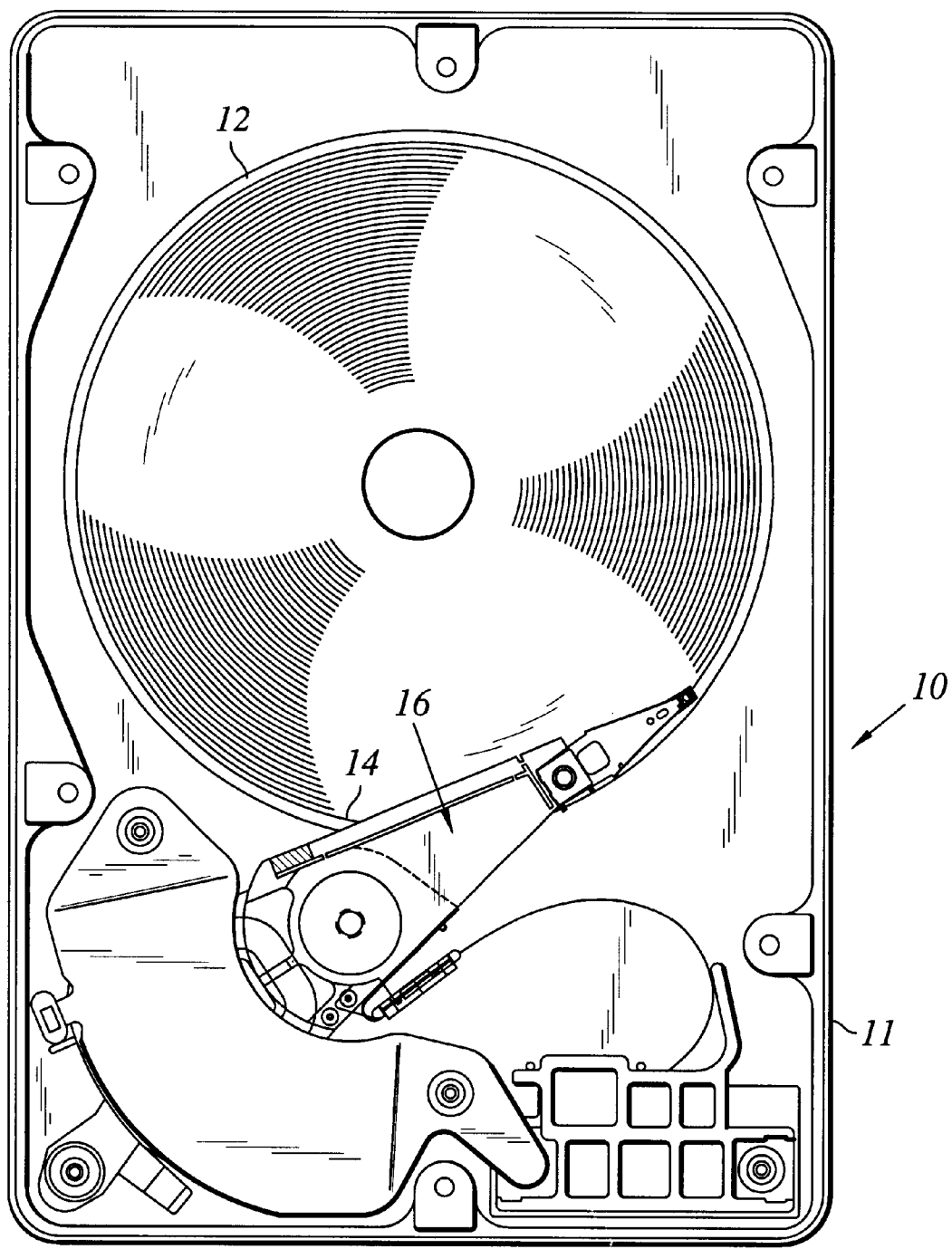
FIG. 1 is top view of a disk drive including a rotatable head stack assembly as constructed in accordance with an aspect of the present invention.
Figure 2:
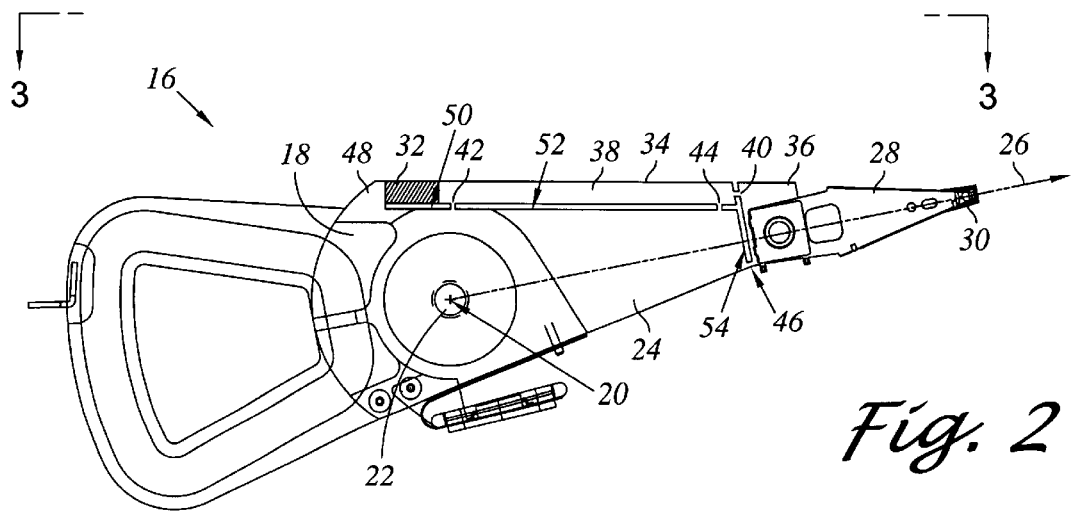
FIG. 2 is an enlarged top view of the head stack assembly of FIG. 1.
Figure 3:
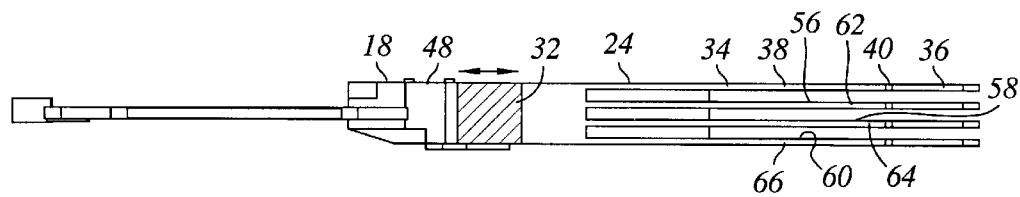
FIG. 3 is a side view of the head stack assembly of FIG. 2 (shown without load beams attached).

Referring now to the drawings wherein the showings are for purposes of illustrating preferred embodiments of the present invention only, and not for purposes of limiting the same, FIGS. 1–3 illustrate a disk drive and head stack assembly in accordance with the present invention.

Referring now to FIG. 1 there is depicted a disk drive 10 having a disk 12 having a track 14. The disk drive 10 is provided with a disk drive base 11 and a head stack assembly 16 coupled to the disk drive base 11 via a pivot bearing cartridge. Referring now to FIG. 2, there is depicted an enlarged top view of the head stack assembly 16. The head stack assembly 16 includes a body portion 18 having a bore 20. The bore 20 defines a pivot axis 22. The head stack assembly 16 further includes at least one actuator arm body 24 extending from the body portion 18 and defining a longitudinal axis 26. The longitudinal axis 26 extends perpendicularly from the pivot axis 22. The body portion 18 and the attached actuator arm bodies 24 are sized and configured to rotate about the pivot axis 22. The head stack assembly 16 further includes at least one load beam 28 extending from the at least one actuator arm body 24 along the longitudinal axis 26. The head stack assembly 16 further includes a head 30 connected to the at least one load beam 28. The head stack assembly 16 further includes a linear actuator 32 connected to the body portion 18. The linear actuator 32 is sized and configured to selectively expand and contract. The head stack assembly 16 further includes an actuation linkage 34 connected with and interposed between the at least one actuator arm body 24 and the associated load beam 28. The actuation linkage 34 is further connected to the linear actuator 32. Selective expansion/contraction of the linear actuator 32 moves the actuation linkage 34 which moves the connected load beam 28 and the connected head 30 with a transverse component relative to the longitudinal axis 26 of the associated actuator arm body 24. As used herein, the term connected refers to mechanical communication between given structural element. In this regard, direct contact is not required and connected may include connectivity via intermediate elements between two given connected elements.

As mentioned above, the linear actuator 34 is connected to the body portion 18. In this regard, the body portion 18 may include a shoulder 48 which extends from the body portion 18. It is contemplated that the shoulder 48 may generally face towards the load beam 28. The linear actuator 32 may be attached to the shoulder 48, with a linear actuator gap 50 formed between the linear actuator 32 and the body portion 18. The linear actuator gap 50 allows the linear actuator 32 to freely expand and contract in directions toward and away from the shoulder 48. The shoulder 48 is contemplated to provide an opposing reactive force in relation to the force generated by the linear actuator 32. In this regard, the linear actuator 32 is contemplated to induce movement towards and away from the general direction of the load beam 28 along the actuator arm body 24 (i.e., the direction of the stroke of the linear actuator 32). Preferably, the linear actuator 32 is a piezo-electric element. It is contemplated that such piezo-electric element is responsive to electrical signals applied thereto for inducing expansion and contraction in physical dimension along at least one desired axis. Preferably, the piezo-electric element is a piezo-electric stack allowing relatively larger stroke at lower voltages in comparison to non-stack implemented piezo-electric elements. The linear actuator 32 may take other forms, such as electromagnetic and electric charge actuators.

In an embodiment of the present invention, the actuation linkage 34 includes a distal member 36 connected with an intermediate member 38. The distal member 36 is distally connected to the actuator arm body 24 and the associated load beam 28. A distal member slot 54 is disposed between the actuator arm body 24 and the load beam 28. The intermediate member 38 is connected to the linear actuator 32 and extends along the associated actuator arm body 24. An intermediate member slot 52 is disposed between the intermediate member 38 and the actuator arm body 24. The actuation linkage 34 may include an actuation linkage hinge 40 interposed between and attached to the distal member 36 and the intermediate member 38. The actuation linkage 34 may include intermediate member hinges 42, 44 interposed between and attached to the intermediate member 38 and the actuator arm body 24. As such, intermediate member hinges 42, 44 extend across the intermediate member slot 52. It is contemplated that only one of the intermediate member hinges 42, 44 or even additional such hinges may be utilized. However, because of the relative elongate disposition of the intermediate member 38 at least two such hinges 42, 44 are desired for support of the intermediate member 38 and to constrain unwanted resonances. The actuation linkage 34 may include a distal member hinge 46 interposed between and attached to the distal member 36 and actuator arm body 24. As such, the distal member hinge 46 extends across the distal member slot 54.

Various techniques may be employed to fabricate the actuation linkage 34 and actuator arm body 24, as well as the connections therebetween, such as intermediate member hinges 42, 44 and distal member hinge 46. In one embodiment, the actuation linkage 34, the actuator arm body 24, the intermediate member hinges 42, 44 and distal member hinges 46 may be formed from a common piece of material. In this regard, in the case of the material being plastic, the various members may be molded as such or undergo a cutting or drilling operation to form the separations. In another embodiment, the hinges 42, 44, 46 may by of another material such as a metal which are over-molded in plastic to form the actuation linkage 34 and actuator arm body 24. In another arrangement, the actuation linkage 34, the actuator arm body 24, and hinges 42, 44, 46 may be stamped from a single piece of metal, such as aluminum. It is contemplated that other fabrication arrangements may be utilized involving combinations of plastic molding and/or over-molding which are well known to those of ordinary skill in the art.

Having thus described the various elements of the depicted embodiment of the actuation linkage 34, a brief description of the movement of the same is in order. Controlled linear movement of the linear actuator 32 will longitudinally move the attached intermediate member 38. In this regard, the intermediate member 38 is induced to translate or slide along the actuator arm body 24 with the intermediate member hinges 42, 44 swaying or assuming an S-shape to facilitate such motion. Such movement of the intermediate member 38 induces movement of the distal member 36 via the actuation linkage hinge 40 which flexes in the process. The distal member 36 is contemplated to swing about the distal member hinge 46, with the distal member hinge 46 flexing to allow rotation. As such, the load beam 28 and attached head 30 may be controllably moved with a component transverse to the longitudinal axis 26 of the actuator arm body 24. Thus, as such movement is independent of the rotation of the actuator arm body 24 about the pivot axis 22, such actuation linkage associated movement is contemplated to be of a dual or second stage nature. It is contemplated that in practicing the present invention, existing load beam subassembly processes need not be modified. Moreover, no specialized handling or electrical connection processes need be implemented in attaching the load beam 28 to the actuator linkage 34, and more specifically the distal member 36, as compared with prior art second stage linear actuator designs having actuators mounted on the load beam subassembly.

Referring now to FIG. 3 there is depicted a side view of the head stack assembly 16 of FIG. 2 (as shown without the at least one load beam 28). The head stack assembly 16 may include additional actuator arm bodies 56, 58, 60 similarly configured as actuator arm body 24 described above. Further, each such additional actuator arm bodies 56, 58, 60 may each be respectively provided with actuation linkages 62, 64, 66 similarly configured as actuation linkage 34 described above. Advantageously, the present invention allows for the single linear actuator 32 to provide the force for simultaneously moving a plurality of actuation linkages 34, 62, 64, 66 for ultimately moving the plurality of associated heads, such as head 30, in comparison to prior art designs in which a plurality of actuators are required for moving each of the heads. As such, the design of the present invention mitigates the technical difficulties associated with prior art designs requiring installation and assembly of actuators on load beams or actuator arm bodies and attendant increased costs and electrical complexity.

I claim:

1. A head stack assembly for use in a disk drive, the head stack assembly comprising:
   a body portion having a bore, the bore defining a pivot axis;
   at least one actuator arm body extending from the body portion and defining a longitudinal axis, the at least one actuator arm body being sized and configured to rotate about the pivot axis disposed perpendicular to the longitudinal axis;
   at least one load beam extending from the at least one actuator arm body along the longitudinal axis;
   a head connected to the at least one load beam;
   a linear actuator connected to the body portion, the linear actuator being sized and configured to selectively expand and contract; and
   at least one actuation linkage connected with and interposed between the at least one actuator arm body and the at least one load beam, the at least one actuation linkage being further connected to the linear actuator, the at least one actuator linkage extending longitudinally along the actuator arm body; and
   wherein selective expansion/contraction of the linear actuator moves the at least one actuation linkage which moves the connected at least one load beam and the connected head with a transverse component relative to the longitudinal axis of the associated at least one actuator arm body.

2. The head stack assembly of claim 1 wherein the at least one actuation linkage includes a distal member connected with an intermediate member, the distal member is distally connected to the at least one actuator arm body and the at least one load beam, the intermediate member is connected to the linear actuator and extends along the at least one actuator arm body.

3. The head stack assembly of claim 2 wherein the at least one actuation linkage includes an actuation linkage hinge interposed between and attached to the distal member and the intermediate member.

4. The head stack assembly of claim 2 wherein the at least one actuation linkage includes a distal member hinge interposed between and attached to the distal member and the at least one actuator arm body.

5. The head stack assembly of claim 2 wherein the at least one actuation linkage includes an intermediate member hinge interposed between and attached to the intermediate member and the at least one actuator arm body.

6. The head stack assembly of claim 1 wherein the at least one actuator arm body includes a plurality of actuator arm bodies, the at least one load beam includes a plurality of load beams associated with respective ones of the plurality of actuator arm bodies, the at least one actuation linkage includes a plurality of actuation linkages associated with respective ones of the plurality of actuator arm bodies and the plurality of load beams.

7. The head stack assembly of claim 1 wherein the linear actuator is a piezo-electric element.

8. The head stack assembly of claim 1 wherein the body portion includes a shoulder, the linear actuator is attached to the shoulder.

9. A disk drive comprising:
   a disk drive base; and
   a head stack assembly coupled to the disk drive base and including:
      a body portion having a bore, the bore defining a pivot axis;
      at least one actuator arm body extending from the body portion and defining a longitudinal axis, the at least one actuator arm body being sized and configured to rotate about the pivot axis disposed perpendicular to the longitudinal axis;
      at least one load beam extending from the at least one actuator arm body along the longitudinal axis;
      a head connected to the at least one load beam;
      a linear actuator connected to the body portion, the linear actuator being sized and configured to selectively expand and contract; and
      at least one actuation linkage connected with and interposed between the at least one actuator arm body and the at least one load beam, the at least one actuation linkage being further connected to the linear actuator, the at least one actuator linkage extending longitudinally along the actuator arm body; and wherein selective expansion/contraction of the linear actuator moves the at least one actuation linkage which moves the connected at least one load beam and the connected head with a transverse component relative to the longitudinal axis of the associated at least one actuator arm body.

10. The disk drive of claim 9 wherein the at least one actuation linkage includes a distal member connected with an intermediate member, the distal member is distally connected to the at least one actuator arm body and the at least one load beam, the intermediate member is connected to the linear actuator and extends along the at least one actuator arm body.

11. The disk drive of claim 10 wherein the at least one actuation linkage includes an actuation linkage hinge interposed between and attached to the distal member and the intermediate member.

12. The disk drive of claim 10 wherein the at least one actuation linkage includes a distal member hinge interposed between and attached to the distal member and the at least one actuator arm body.

13. The disk drive of claim 10 wherein the at least one actuation linkage includes an intermediate member hinge interposed between and attached to the intermediate member and the at least one actuator arm body.

14. The disk drive of claim 9 wherein the at least one actuator arm body includes a plurality of actuator arm bodies, the at least one load beam includes a plurality of load beams associated with respective ones of the plurality of actuator arm bodies, the at least one actuation linkage includes a plurality of actuation linkages associated with respective ones of the plurality of actuator arm bodies and the plurality of load beams.

15. The disk drive of claim 9 wherein the linear actuator is a piezoelectric element.

16. The disk drive of claim 9 wherein the body portion includes a shoulder, the linear actuator is attached to the shoulder.

* * * * *